United States Patent
Kim et al.

(10) Patent No.: US 11,495,785 B2
(45) Date of Patent: Nov. 8, 2022

(54) NEGATIVE ELECTRODE FOR SECONDARY BATTERY AND METHOD FOR PRODUCING SAME

(71) Applicant: LG CHEM, LTD., Seoul (KR)

(72) Inventors: Young Jae Kim, Daejeon (KR); Je Young Kim, Daejeon (KR)

(73) Assignee: LG ENERGY SOLUTION, LTD., Seoul (KR)

(*) Notice: Subject to any disclaimer, the term of this patent is extended or adjusted under 35 U.S.C. 154(b) by 349 days.

(21) Appl. No.: 16/477,441

(22) PCT Filed: Dec. 27, 2017

(86) PCT No.: PCT/KR2017/015555
§ 371 (c)(1),
(2) Date: Jul. 11, 2019

(87) PCT Pub. No.: WO2018/186558
PCT Pub. Date: Oct. 11, 2018

(65) Prior Publication Data
US 2019/0355974 A1    Nov. 21, 2019

(30) Foreign Application Priority Data
Apr. 6, 2017  (KR) .................. 10-2017-0044839

(51) Int. Cl.
*H01M 4/133*    (2010.01)
*H01M 4/134*    (2010.01)
(Continued)

(52) U.S. Cl.
CPC ............ *H01M 4/133* (2013.01); *H01M 4/134* (2013.01); *H01M 4/386* (2013.01); *H01M 4/622* (2013.01); *H01M 2004/027* (2013.01)

(58) Field of Classification Search
None
See application file for complete search history.

(56) References Cited

U.S. PATENT DOCUMENTS

2014/0050975 A1    2/2014    Cha et al.
2014/0170484 A1    6/2014    Fukahori
(Continued)

FOREIGN PATENT DOCUMENTS

CN    104795559 A    7/2015
CN    104810506 A    7/2015
(Continued)

OTHER PUBLICATIONS

Komaba. "Comparative Study of Sodium Polyacrylate and Poly(vinylidene fluoride) as Binders for High Capacity Si-Graphite Composite Negative Electrodes in Li-Ion Batteries." American Chemical Society. (Year: 2011).*

(Continued)

*Primary Examiner* — Haroon S. Sheikh
(74) *Attorney, Agent, or Firm* — Birch, Stewart, Kolasch & Birch, LLP

(57) ABSTRACT

A negative electrode for a secondary battery, and a method for producing the same, and more particularly, to a negative electrode for a secondary battery used for a negative electrode of a secondary battery, and a method for producing the same. A negative electrode for a secondary battery may include a carbon-based active material; a conductive material; and a silicon-based active material-polymer binder combination including a silicon-based active material, and a polymer binder for suppressing the expansion of the silicon-based active material bonded to a particle surface of the silicon-based active material.

6 Claims, 3 Drawing Sheets

(51) Int. Cl.
*H01M 4/38* (2006.01)
*H01M 4/62* (2006.01)
*H01M 4/02* (2006.01)

(56) References Cited

U.S. PATENT DOCUMENTS

| | | | | |
|---|---|---|---|---|
| 2015/0125744 | A1* | 5/2015 | Hosaka | H01M 4/386 429/212 |
| 2016/0006024 | A1 | 1/2016 | Xiao et al. | |
| 2017/0288231 | A1 | 10/2017 | Yoon et al. | |
| 2018/0166738 | A1 | 6/2018 | Kimura et al. | |
| 2019/0260011 | A1* | 8/2019 | Ho | H01M 4/133 |

FOREIGN PATENT DOCUMENTS

| | | |
|---|---|---|
| CN | 105304858 A | 2/2016 |
| CN | 106410177 A | 2/2017 |
| EP | 3 057 157 A1 | 8/2016 |
| EP | 3 535 794 A1 | 9/2019 |
| JP | 5158460 B2 | 3/2013 |
| JP | 5505479 B2 | 5/2014 |
| JP | 2016-219370 A | 12/2016 |
| JP | 6042444 B2 | 12/2016 |
| KR | 10-2012-0069314 A | 6/2012 |
| KR | 10-2014-0024586 A | 3/2014 |
| KR | 10-2014-0079702 A | 6/2014 |
| KR | 10-2014-0117947 A | 10/2014 |
| KR | 10-2015-0049271 A | 5/2015 |
| KR | 10-2015-0063270 A | 6/2015 |
| KR | 10-2015-0071452 A | 6/2015 |
| KR | 10-1621519 B1 | 5/2016 |
| KR | 10-2016-0102407 A | 8/2016 |
| KR | 10-2017-0036417 A | 4/2017 |
| WO | WO 2006/009284 A1 | 1/2006 |
| WO | WO 2013/005887 A1 | 1/2013 |
| WO | WO 2015/118849 A1 | 3/2017 |
| WO | WO 2017/038669 A1 | 3/2017 |
| WO | WO 2018/082601 A1 | 5/2018 |

OTHER PUBLICATIONS

International Search Report (PCT/ISA/210) issued in PCT/KR2017/015555, dated Apr. 9, 2018.

European Search Report for Application No. 17904611.5 dated Jan. 31, 2020.

* cited by examiner

【Fig. 1】
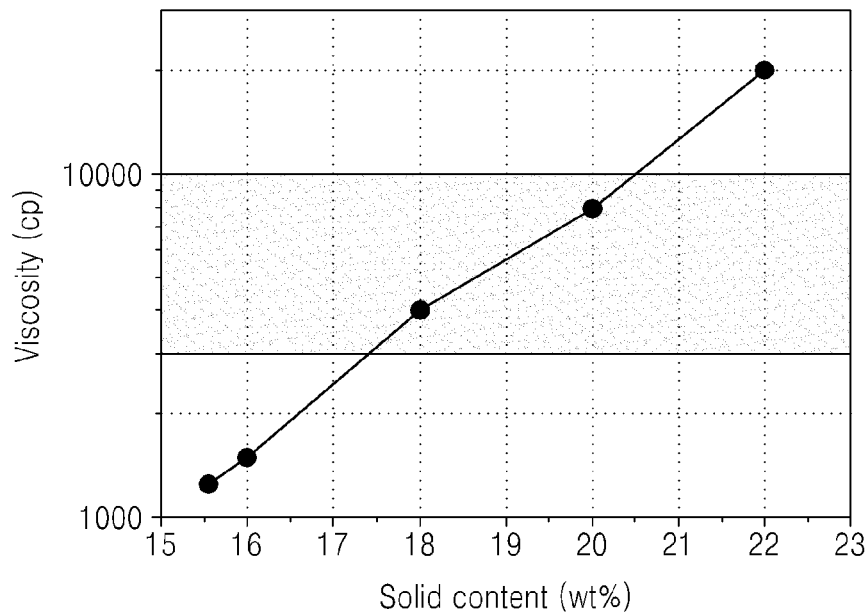
【Fig. 2】
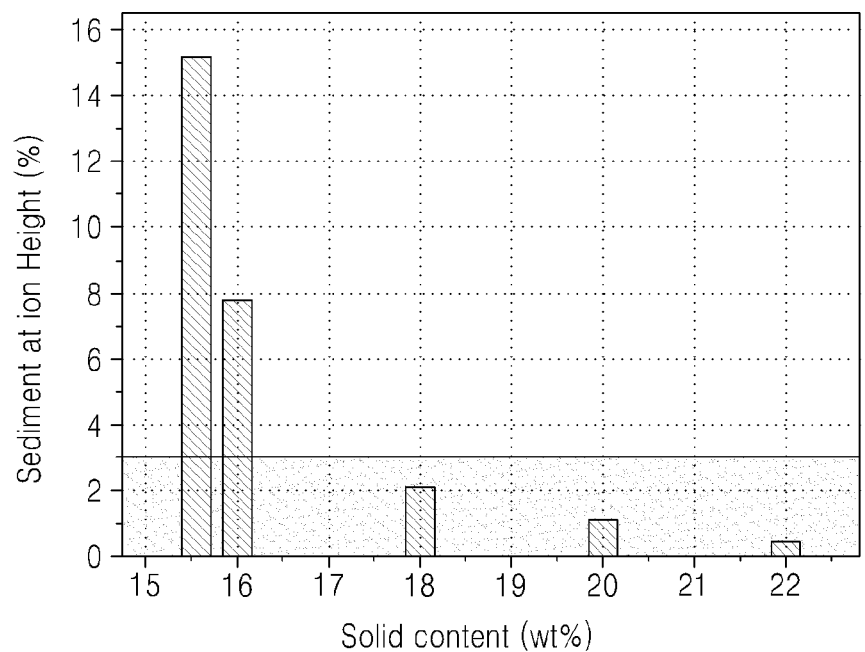

【Fig. 3】
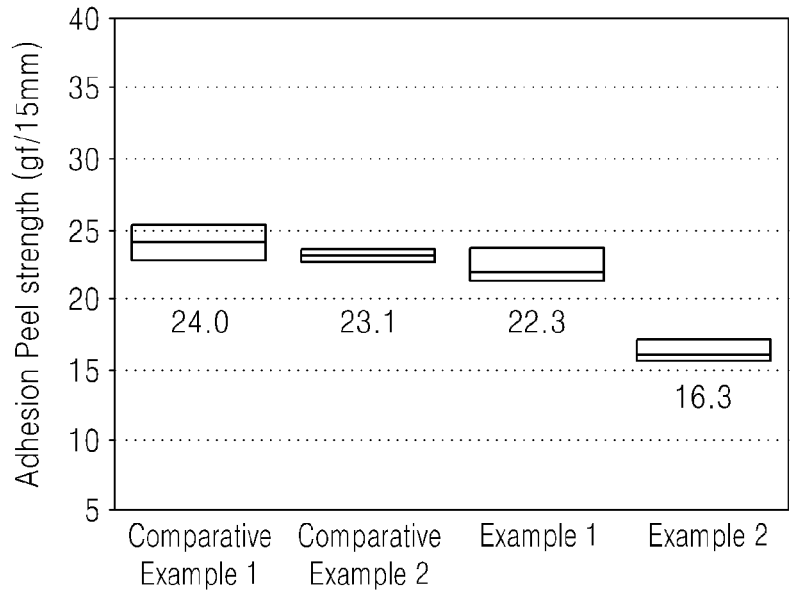
【Fig. 4】
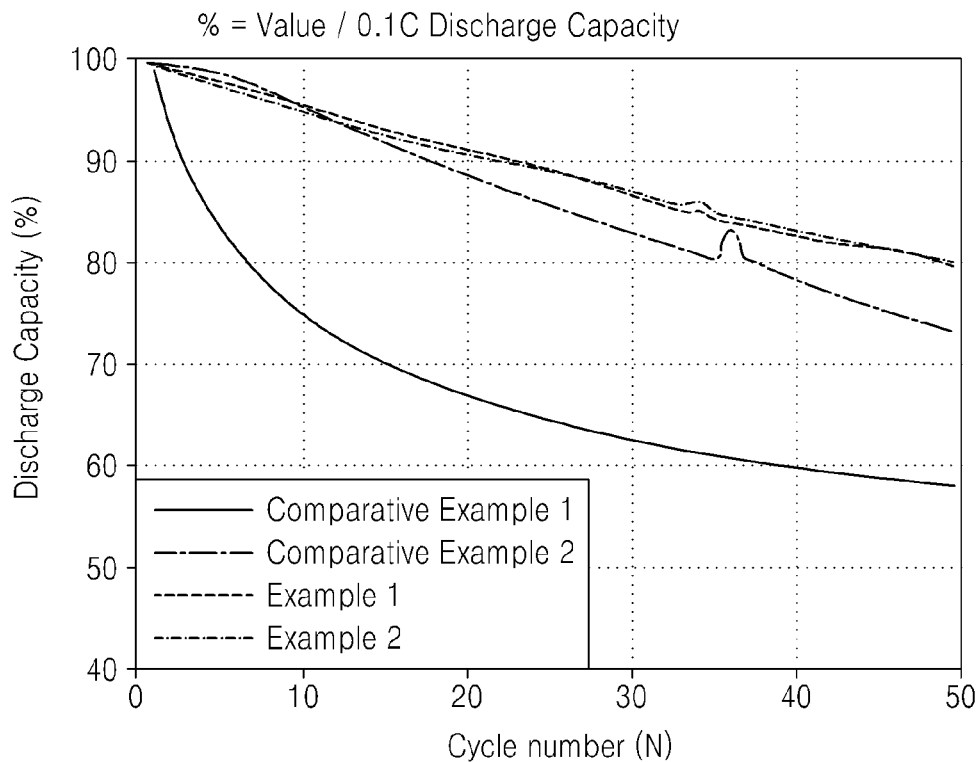

[Fig. 5]
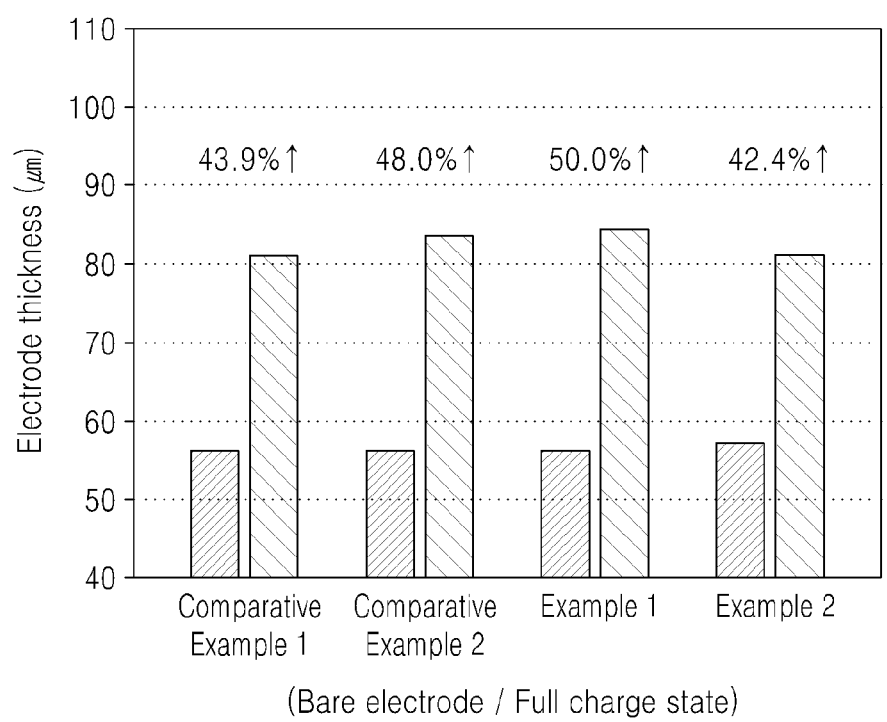

NEGATIVE ELECTRODE FOR SECONDARY BATTERY AND METHOD FOR PRODUCING SAME

TECHNICAL FIELD

The present disclosure relates to a negative electrode for a secondary battery, and a method for producing the same, and more particularly, to a negative electrode for a secondary battery used for a negative electrode of a secondary battery, and a method for producing the same.

BACKGROUND ART

Recently, interest in energy storage technology has increased. As the application fields are expanded to energy of mobile phones, camcorders, notebook PCs, and even to that of electric vehicles, efforts for research and development of electrochemical devices are more and more materialized. In this respect, electrochemical devices are receiving the most attention, and in particular, the development of a rechargeable secondary battery has become the center of attention. Recently, in developing such batteries, the research and development for the design of a new electrode and a new battery have been conducted in order to improve a capacity density and specific energy.

Among secondary batteries currently being applied, a lithium secondary battery has advantages over conventional batteries such as N-MH, Ni—Cd, and sulfuric acid-lead batteries which use an aqueous electrolyte in that the operating voltage thereof is higher and the energy density thereof is much greater.

In general, in a lithium secondary battery, materials capable of intercalating and deintercalating, or alloying and dealloying lithium ions are used as a negative electrode and a positive electrode, and an organic electrolyte or a polymer electrolyte is filled between the negative electrode and the positive electrode to manufacture the lithium secondary battery. When lithium ions are intercalated and deintercalated from the positive electrode and the negative electrode, electrical energy is generated by an oxidation reaction and a reduction reaction.

Currently, a carbon-based material is mainly used as an electrode active material constituting a negative electrode of a lithium secondary battery. In the case of graphite, the theoretical capacity is about 372 mAh/g, and the actual capacity of the currently commercialized graphite is realized to an extent of about 350 to 360 mAh/g. However, the capacity of a carbon-based material such as graphite is not compatible with a lithium secondary battery requiring a high-capacity negative electrode active material.

In order to meet such a demand, there is an example in which a silicon-based material is used as a negative electrode active material, the silicon-based material which exhibits a higher charge/discharge capacity than a carbon-based material, and which is a metal that is capable of being electrochemically alloyed with lithium. However, such a silicon-based material has a high capacity, but has a very high electrode expansion rate compared with that of a carbon-based material, and has a very low charge/discharge efficiency, so that there is a problem in that it is difficult to use a silicon-based material in a large proportion in a negative electrode. In addition, due to the charge/discharge characteristic thereof, charging at a low voltage lasts for a very long time so that the entire charge/discharge time of a secondary battery is significantly delayed.

RELATED ART DOCUMENT

Korea Patent Publication No. 2014-0117947

DISCLOSURE OF THE INVENTION

Technical Problem

The present invention relates to a negative electrode for a secondary battery, and a method for producing the same, and more particularly, to a negative electrode for a secondary battery for suppressing the volume expansion of a negative active material due to the intercalation and deintercalation of lithium, and a method for producing the same.

Technical Solution

A negative electrode for a secondary battery according to an embodiment of the present invention includes a carbon-based active material; a conductive material; and a silicon-based active material-polymer binder combination including a silicon-based active material, and a polymer binder bonded to a surface of the silicon-based active material, wherein the polymer binder suppresses expansion of the silicon-based active material.

The silicon-based active material may be included in an amount of 5 to 15 wt % based on a total weight of active material including the carbon-based active material and the silicon-based active material.

The polymer binder may be included in an amount of 25 to 45 wt % based on a weight of the silicon-based active material.

The polymer binder may include a hydrophilic polymer material having a hydroxy group (—OH).

The polymer binder may include at least one of polyacrylic acid (PAA), polyvinyl alcohol (PVA), or sodium-polyacrylate (Na-PA).

The negative electrode for a secondary battery may have an initial discharge capacity of 470 mAh or greater.

The negative electrode for a secondary battery may have an initial charge/discharge efficiency of 87% or greater.

In addition, a method for producing a negative electrode for a secondary battery according to an embodiment of the present invention includes preparing a carbon-based active material; preparing a pre-dispersion slurry by mixing a silicon-based active material, a conductive material, and a polymer binder in a dispersion medium; preparing a negative electrode slurry by mixing the pre-dispersion slurry and the carbon-based active material; applying the prepared negative electrode slurry on a current collector; and forming a negative electrode by removing moisture from the negative electrode slurry.

The pre-dispersion slurry may be formed by dispersing a silicon-based active material-polymer binder combination in which the silicon-based active material and a polymer binder are bonded, and the conductive material.

A solid content of the pre-dispersion slurry may be controlled by a viscosity of the pre-dispersion slurry.

The solid content of the pre-dispersion slurry may be controlled such that the pre-dispersion slurry has a viscosity of 3000 to 10000 cp.

The pre-dispersion slurry may have a solid content of 15 to 25 wt % based on the total weight of the pre-dispersion slurry.

The preparing of the negative electrode slurry may include preparing a first negative electrode slurry by first mixing a portion of the pre-dispersion slurry and the carbon-based active material; and preparing a second negative electrode slurry by mixing the first negative electrode shiny and a remaining portion of the pre-dispersion slurry.

The negative electrode slurry may have a solid content of 40 to 50 wt % based on the total weight of the negative electrode slurry.

Advantageous Effects

According to the negative electrode for a secondary battery and the method for producing the same according to an embodiment of the present invention, by using a silicon-based active material-polymer binder combination in which a polymer binder for suppressing the expansion of a silicon-based active material is absorbed to the silicon-based active material, it is possible to effectively suppress the volume expansion of the silicon-based active material.

Also, in the case in which a negative electrode active material including both a carbon-based active material and a silicon-based active material is used, a pre-dispersion slurry is prepared by pre-dispersing the silicon-based active material in a polymer binder such that the polymer binder may be selectively absorbed on the surface of the silicon-based active material with strong adhesion strength.

That is, the volume expansion of a silicon-based active material is effectively suppressed, thereby improving the durability of a negative electrode for a secondary battery, and the lifespan characteristic of an electrochemical device manufactured by using the same may be remarkably improved.

BRIEF DESCRIPTION OF THE DRAWINGS

FIG. 1 is a diagram showing the change in viscosity according to the solid content of a pre-dispersion slurry.

FIG. 2 is a diagram showing the change in sedimentation height according to the solid content of a pre-dispersion slurry.

FIG. 3 is a diagram showing the result of comparative analysis of the adhesion strength of a secondary battery using a negative electrode according to an embodiment of the present invention.

FIG. 4 is a diagram showing the charge/discharge result of a secondary battery using a negative electrode according to an embodiment of the present invention.

FIG. 5 is a diagram showing the change in electrode thickness of a secondary battery using a negative electrode according to an embodiment of the present invention.

MODE FOR CARRYING OUT THE INVENTION

A negative electrode for a secondary battery, and a method for producing the same according to the present invention provide a technical feature capable of suppressing the volume expansion of a negative electrode active material due to the intercalation and deintercalation of lithium.

Hereinafter, embodiments of the present invention will be described in detail with reference to the accompanying drawings. However, the present invention should not be construed as limited to the embodiments set forth herein, but may be embodied in various forms different from each other. Rather, these embodiments are provided so that the disclosure of the present invention will be thorough and complete, and will fully convey the scope of the present invention to those skilled in the art. Like reference numerals refer to like elements throughout.

A negative electrode for a secondary battery according to an embodiment of the present invention includes a carbon-based active material; a conductive material; and a silicon-based active material-polymer binder combination including a silicon-based active material, and a polymer binder for suppressing the expansion of the silicon-based active material bonded to a particle surface of the silicon-based active material.

A conventional negative electrode for a secondary battery increases the loading of a negative electrode active material formed on a current collector, increases the number of stacks of an electrode in a manufacturing process, or increases the number of winding of an electrode to achieve a high capacity. However, such a method has a limitation in application due to the structure of an electrode.

In order to solve this problem, there is provided a method in which a certain amount of a negative electrode active material is substituted with a silicon-based material which is a high-capacity material. However, in the case in which a silicon-based active material is included to be substituted with a certain amount of a negative electrode active material, cracks are generated and pulverized due to a large volume change accompanied by charging and discharging of lithium, and a secondary battery using such a negative electrode active material still has problems in that the capacity thereof is rapidly reduced as charge/discharge cycles progresses, and the cycle lifespan is shortened.

According to an embodiment of the present invention, when substituting a certain amount of a negative electrode active material with a silicon-based material which is a high-capacity material, a silicon-based active material-polymer binder combination in which a silicon-based active material, and a polymer binder for suppressing the expansion of the silicon-based active material are bonded is used. Such a silicon-based active material-polymer binder combination may be formed from a pre-dispersion aqueous solution prepared by pre-dispersing a hydrophilic polymer which is absorbed on a particle surface of the silicon-based active material but has very low wettability to an electrolyte with a conductive material and the silicon-based active material. Such a method for producing a negative electrode from a pre-dispersion aqueous solution will be described later with reference to a method for producing a negative electrode for a secondary battery according to an embodiment of the present invention.

The carbon-based active material is not particularly limited as long as it is capable of intercalating and deintercalating lithium. For example, the carbon-based active material may be one material or a mixture of two or more materials selected from the group consisting of graphite, graphitizable carbon (also referred to as soft carbon), non-graphitizable carbon (also referred to as hard carbon), carbon black, grapheme, and a graphene oxide.

The silicon-based active material is used to substitute a certain amount of carbon-based active material, and may be one material or a mixture of two or more materials selected from the group consisting of Si, SiOx, and an Si alloy. The silicon-based active material is substituted with a certain amount of carbon-based active material in a range that increases the capacity of a negative electrode, and at the same time, prevents the excessive expansion thereof, and may be included in an amount of 5 to 25 wt % based on the total weight of active material including the carbon-based active material and the silicon-based active material.

The conductive material is not particularly limited as long as it has conductivity without causing a side reaction with other elements of a secondary battery. For example, the conductive material may include one material or a mixture of two or more materials selected from the group consisting of graphite such as natural graphite, artificial graphite, and the like; carbon black such as carbon black (super-p), acetylene black, ketjen black, channel black, furnace black, lamp black, summer black, and the like; a conductive fiber such as a carbon fiber, a carbon nanofiber, a metal fiber, and the like; metal powder such as carbon fluoride, aluminum, nickel powder, and the like; a conductive whisker such as a zinc oxide, potassium titanate, and the like; a conductive metal oxide such as a titanium oxide, and the like; and a conductive material such as a polyphenylene derivative, and the like.

The conductive material may be included in a range such that a negative electrode for a secondary battery maintains conductivity. When used in an amount of 5 wt % or greater based on the total weight of the silicon-based active material, the charge/discharge efficiency is rapidly increased, and when used in an amount of 10 wt % or greater, it is possible to obtain a charge/discharge efficiency of 95% or more. As the content of the conductive material is increased, it is possible to form an effective conductive network. However, in order to control the solid concentration of the generated negative electrode slurry, the content may be controlled to be 20 wt % or less based on the total weight of the silicon-based active material.

The polymer binder is adsorbed on at least a portion of the surface of the silicon-based active material to be used in order to suppress the expansion of the silicon-based active material. The polymer binder is adsorbed on a particle surface of the silicon-based active material, but may include a hydrophilic polymer having very low wettability to an electrolyte, and the hydrophilic polymer has a plurality of hydroxyl groups (—OH) capable of hydrogen bonding which is a strong bonding to be dispersed in water. As a result, the polymer binder has rigidity, has a high possibility of being adsorbed on the surface of the silicon-based active material due to strong bonding force, and has a characteristic of not being wet in an electrolyte which is an organic solution due to strong hydrophilicity.

As described above, the polymer binder includes a polymer material having strong hydrophilicity. For example, the polymer binder may include one material or a mixture of two or more materials selected from the group consisting of a polyethylene oxide, a polypropylene oxide, polyacrylic acid, polyvinyl alcohol, polyvinyl acetate, and sodium-polyacrylate. Preferably, the polymer binder may include at least one of polyacrylic acid (PAA), polyvinyl alcohol (PVA), or sodium-polyacrylate (Na-PA), all of which have excellent adsorption force to a silicon-based active material.

The polymer binder may be included in a range that prevents the disconnection of a conductive network and maximizes the charge/discharge efficiency of a secondary battery, and when used in an amount of 25 wt % or greater based on the total weight of the silicon-based active material, the charge/discharge efficiency of a secondary battery may be rapidly increased and maintained. However, if the content of the polymer binder is excessively increased, the viscosity of a pre-dispersion slurry increases so that the dispersibility is deteriorated and the workability is reduced in a manufacturing process of a negative electrode. Therefore, the content may be controlled to be 45 wt % or less based on the total weight of the silicon-based active material.

As described above, the silicon-based active material-polymer binder combination is formed from a pre-dispersion slurry prepared by pre-dispersing a hydrophilic polymer adsorbed to a particle surface of the silicon-based active material but having very low wettability to an electrolyte with the conductive material and the silicon-based active material. That is, in order to use the silicon-based active material having high charge/discharge capacity, it is very important to suppress the volume expansion of the silicon-based active material due to charging/discharging, and the volume expansion of the silicon-based active material is suppressed by the polymer binder adsorbed to the silicon-based active material.

The pre-dispersion slurry is then mixed with the carbon-based active material to be prepared as the negative electrode slurry. In preparing a negative electrode using a negative electrode active material including the carbon-based active material and the silicon-based active material, by preparing a pre-dispersion slurry by pre-dispersing only the silicon-based active material with the conductive material and the polymer binder, it is possible to effectively suppress the volume expansion of the silicon-based active material.

That is, in the case of preparing the negative electrode slurry by dispersing the conductive material and the polymer binder with the negative electrode active material including the carbon-based active material and the silicon-based active material, when mixing the polymer binder, the object on which the polymer binder is absorbed is not limited to the silicon-based active material, but is extended to the carbon-based active material. Accordingly, the degree to which the polymer binder is absorbed to the silicon-based active material is reduced so that the volume expansion of the silicon-based active material may not be sufficiently suppressed.

On the other hand, when the pre-dispersion slurry is prepared by pre-dispersing the silicon-based active material with the conductive material and the polymer binder, it is possible that the polymer binder is selectively adsorbed on the surface of the silicon-based active material. That is, the surface of the silicon-based active material generally has hydrophilicity, and the polymer binder to be mixed includes a hydrophilic polymer material. Therefore, it is possible to form the silicon-based active material-polymer binder combination by effectively attaching the polymer binder to the surface of the silicon-based active material with strong hydrogen bonding force along with van der Walls force.

Hereinafter, a method for producing a negative electrode for a secondary battery according to an embodiment of the present invention will be described in detail.

The method for producing a negative electrode for a secondary battery according to an embodiment of the present invention includes preparing a carbon-based active material S100; preparing a pre-dispersion slurry by mixing a silicon-based active material, a conductive material, and a polymer binder in a dispersion medium S200; preparing a negative electrode slurry by mixing the pre-dispersion slurry and the carbon-based active material S300; applying the prepared negative electrode slurry on a current collector S400; and forming a negative electrode by removing moisture from the negative electrode slurry S500.

Here, the preparing a carbon-based active material S100 and the preparing a pre-dispersion slurry by mixing a silicon-based active material, a conductive material, and a polymer binder in a dispersion medium S200 are not in a time-series sequencing relation to each other. The preparing a pre-dispersion slurry S200 may be performed after the preparing a carbon-based active material S100 is performed, or the preparing a carbon-based active material S100 may be performed after the preparing a pre-dispersion slurry S200 is performed. The preparing a carbon-based active material S100 and the preparing a pre-dispersion slurry S200 may be performed simultaneously.

In the preparing a carbon-based active material S100, a carbon-based active material in a power state is first prepared. Here, as the carbon-based active material, various carbon-based materials capable of absorbing and discharging lithium may be used as described above.

In the preparing a per-dispersion slurry S200, a pre-dispersion mixture is first formed by mixing a silicon-based active material in a powder state, a conductive material, and a polymer binder. Then, a dispersion medium, for example, water, is added to the mixture and stirred to prepare a pre-dispersion slurry. The adding of water to the mixture and stirring may be carried out by a saw blade type mixer having a rotation speed exceeding 2000 to 2500 rpm such as a homogenizer, a universal stirrer, a clear mixer, and a fill mixer which are known in the art, or by equipment such as a bead mill, a ball mill, a basket mill, an attrition mill, and the like, of which a filling material such as beads are filled thereto to perform mixing.

In the case of forming a per-dispersion mixture by mixing a silicon-based active material, a conductive material, and a polymer binder, the per-dispersion slurry is formed by dispersing the silicon-based active material-polymer binder combination in which the silicon-based active material and the polymer binder is bonded and the conductive material in water which is a dispersion medium.

Here, the solid content of the pre-dispersion slurry is controlled by the viscosity of the pre-dispersion slurry.

In detail, the viscosity of the pre-dispersion slurry prepared by the same mixing process is determined by the ratio of the polymer binder to the silicon-based active material. That is, as the content of the polymer binder is increased, the viscosity of the pre-dispersion slurry is increased, and in the case of the silicon-based active material, the solid density thereof is from 2.1 to 2.35 g/cm$^3$. Accordingly, in order to suppress the sedimentation of the silicon-based active material after the per-dispersion slurry is prepared, a viscosity of a certain range is required.

Here, the range of the viscosity is limited in order to improve the workability while suppressing the sedimentation of the silicon-based active material to the maximum. The pre-dispersion slurry may have a viscosity of 3000 to 10000 cp. That is, in the case in which the viscosity of the pre-dispersion slurry is less than 3000 cp, the sediment rate of the silicon-based active material is increased, so that particles of the silicon-based active material sink rapidly during the rest period of the pre-dispersion slurry, resulting in the deterioration of the physical properties of the pre-dispersion slurry. In the case in which the viscosity of the pre-dispersion slurry is greater than 10000 cp, the dispersibility of the pre-dispersion slurry is reduced and the workability in performing the process becomes very low.

FIG. 1 is a diagram showing the change in viscosity according to the solid content of a pre-dispersion slurry. FIG. 2 is a diagram showing the change in sedimentation height according to the solid content of a pre-dispersion slurry. In FIGS. 1 and 2, the case of which the ratio of the polymer binder to the silicon-based active material is 1:0.34 will be described as an example.

As shown in FIG. 1, in the case in which the ratio of the polymer binder to the silicon-based active material is 1:0.34, when the solid content has a value of 17.5 to 20.5 wt % based on the total weight of the pre-dispersion slurry, the pre-dispersion slurry has a viscosity of 3000 to 10000 cp. Therefore, in the case in which the ratio of the polymer binder to the silicon-based active material is 1:0.34, the suitable solid content of the pre-dispersion slurry is determined to be a value of 17.5 to 20.5 wt %.

In FIG. 2, after the pre-dispersion slurry is prepared with the ratio of the polymer binder to the silicon-based active material of 1:0.34, a certain amount thereof is collected in a vial capable of measuring length, and the height of the bottom surface of the pre-dispersion slurry is measured. Thereafter, post-processing is performed for 24 hours at room temperature, and then a bar having a certain length is inserted into the vial to measure the height of the bottom surface of the pre-dispersion slurry again.

In the case of the pre-dispersion slurry, the sedimentation rate is determined according to a certain viscosity ratio, and the sedimented silicon-based active material and the polymer binder are accumulated on the bottom surface. From the height measured by the inserted bar after 24 hours, it is possible to measure the height of the sedimentation layer finally sedimented on the bottom of the vial, and to confirm proportionally how much has been sedimented during a certain period of time. Here, the reason for measuring the height of the sedimented layer after 24 hours is that when mass producing negative electrodes for a secondary battery, a rest period is given according to a process, and the rest period is usually 12 to 24 hours. Therefore, the height of the sedimentation layer was measured after 24 hours.

As shown in FIG. 2, in the case in which the ratio of the polymer binder to the silicon-based active material is 1:0.34, when the solid content of the pre-dispersion slurry has a value of 17.5 to 20.5 wt % based on the total weight of the pre-dispersion slurry, it can be seen that the ratio of the sedimentation layer is within 3%. From this, it can be seen that in the case in which the solid content of the pre-dispersion slurry is 17.5 wt % or greater, the pre-dispersion slurry has a viscosity of 3000 to 10000 cp, so that it is possible to effectively achieve the sedimentation of the silicon-based active material and the polymer binder.

Therefore, in the preparing a pre-dispersion slurry S200, the solid content of the pre-dispersion slurry may be controlled such that the pre-dispersion slurry may have a viscosity of 3000 to 10000 cp. As described above, since the polymer binder may be included in an amount of 25 to 45 wt % based on the weight of the silicon-based active material, in order to have the viscosity of the pre-dispersion slurry within a range satisfying the above range, the pre-dispersion slurry may have a solid content of 15 to 25 wt % based on the total weight.

In the preparing a negative electrode slurry S300, when the pre-dispersion slurry is prepared by the process described above, a negative electrode slurry is prepared by mixing the pre-dispersion slurry and the carbon-based active material. By preparing the pre-dispersion slurry as described above, and preparing the negative electrode slurry by mixing the prepared pre-dispersion slurry with the carbon-based active material, the polymer binder may be selectively adsorbed on the surface of the silicon-based active material. That is, the surface of the silicon-based active material generally has hydrophilicity, and the polymer binder to be mixed includes a hydrophilic polymer material, thereby being effectively attached to the surface of the silicon-based active material with strong hydrogen bonding force along with van der Walls force, so that it is possible to form a silicon-based active material-polymer binder combination.

Here, the negative electrode slurry may have a solid content of 40 to 50 wt % based on the total weight. That is, the pre-dispersion slurry has a solid content of 15 to 25 wt % based on the total weight of the pre-dispersion slurry, and by mixing the carbon-based active material, the negative electrode slurry may have a solid content of 40 to 50 wt % based on the total weight of the negative electrode slurry. By maintaining the solid content of the negative electrode slurry to be in the range above described, it is possible to improve the workability while applying, and at the same time, to improve the rate of drying for removing water from the negative electrode slurry.

In the applying the negative electrode slurry on a current collector S400, the negative electrode slurry prepared in the preparing a negative electrode S300 is applied on the current collector. Here, in general, a current collector having a thickness of 3 μm to 500 μm may be used, and is not particularly limited as long as it has high conductivity without causing chemical change in a secondary battery. For example, copper, stainless steel, aluminum, nickel, titanium, sintered carbon, or aluminum, or stainless steel, the surface of which are treated with carbon, nickel, titanium, or silver, and the like may be used.

The forming a negative electrode S500 is performed by removing water from the negative electrode slurry. The water included in the negative electrode slurry may be removed by drying the negative electrode slurry applied on the current collector, and a common method used for forming a negative electrode may be used.

Hereinafter, the result according to an embodiment of the present invention will be described in comparison with the experimental results of each comparative example and example. Here, the following examples are provided to illustrate the present invention, and the scope of the present invention is not limited by experimental conditions.

Comparative Example 1

As a negative electrode active material, a carbon-based active material and a silicon-based active material were used in an amount of 90 wt % and 10 wt % respectively based on the total weight of the negative electrode active material.

A conductive material of carbon black was dispersed in water which is a dispersion medium, and the negative electrode active material was mixed thereto as a whole. Then, carboxymethyl cellulose (CMC) which is a thickener, and styrene butylene rubber (SBR) which is a binder were sequentially mixed therewith to prepare a negative electrode slurry, and the negative electrode slurry was applied on a current collector and dried to form a negative electrode for a secondary battery.

The negative electrode for a secondary battery was formed of the negative electrode active material of 95.6 wt %, the conductive material of 1.0 wt %, the thickener of 1.1 wt %, and the binder of 2.3 wt %.

Here, the loading of the negative electrode for a secondary battery of Comparative Example 1 was 204 mg/25 cm$^2$, and the porosity thereof was 33.9%.

Comparative Example 2

As a negative electrode active material, a carbon-based active material and a silicon-based active material were used in an amount of 90 wt % and 10 wt % respectively based on the total weight of the negative electrode active material.

A conductive material of carbon black was dispersed in water which is a dispersion medium, and the negative electrode active material was mixed thereto as a whole. Then, a polymer binder was added thereto to prepare a negative electrode slurry, and the negative electrode slurry was applied on a current collector and dried to form a negative electrode for a secondary battery.

The negative electrode for a secondary battery was formed of the negative electrode active material of 95.6 wt %, the conductive material of 1.0 wt %, and the polymer binder of 3.4 wt %.

Here, the loading of the negative electrode for a secondary battery of Comparative Example 2 was 203 mg/25 cm$^2$, and the porosity thereof was 34.1%.

Example 1

As a negative electrode active material, a carbon-based active material and a silicon-based active material were used in an amount of 90 wt % and 10 wt % respectively based on the total weight of the negative electrode active material.

A conductive material of carbon black, a silicon-based active material, and a polymer binder were pre-dispersed in water which is a dispersion medium to prepare a pre-dispersion slurry, and a carbon-based active material was mixed therewith to prepare a negative electrode slurry. Thereafter, the negative electrode slurry was applied on a current collector and dried to form a negative electrode for a secondary battery. Here, 26.4 wt % of the pre-dispersion slurry based on the total weight was first mixed with the carbon-based active material to prepare a first negative electrode slurry, and then the prepared first negative electrode slurry and the remaining 73.6 wt % of the pre-dispersion slurry were further mixed to prepare a second negative electrode slurry. The second negative electrode slurry was used as the final negative electrode slurry.

The negative electrode for a secondary battery was formed of the negative electrode active material of 95.6 wt %, the conductive material of 1.0 wt %, and the polymer binder of 3.4 wt %.

Here, the loading of the negative electrode for a secondary battery of Example 1 was 200 mg/25 cm$^2$, and the porosity thereof was 34.8%.

Example 2

As a negative electrode active material, a carbon-based active material and a silicon-based active material were used in an amount of 90 wt % and 10 wt % respectively based on the total weight of the negative electrode active material.

A conductive material of carbon black, a silicon-based active material, and a polymer binder were pre-dispersed in water which is a dispersion medium to prepare a pre-dispersion slurry, and a carbon-based active material was mixed therewith to prepare a negative electrode slurry. Thereafter, the negative electrode slurry was applied on a current collector and dried to form a negative electrode for a secondary battery. Here, the pre-dispersion slurry and the carbon-based slurry were mixed as a whole to be used as the final negative electrode slurry.

The negative electrode for a secondary battery was formed of the negative electrode active material of 95.6 wt %, the conductive material of 1.0 wt %, and the polymer binder of 3.4 wt %.

Here, the loading of the negative electrode for a secondary battery of Example 1 was 205 mg/25 cm$^2$, and the porosity thereof was 34.2%.

FIG. 3 is a diagram showing the result of comparative analysis of the adhesion strength of a secondary battery using a negative electrode according to an embodiment of the present invention.

As shown in FIG. 3, in the cases of Comparative Example 1 and Comparative Example 2, the adhesion strength to the current collector was higher than that of Example 1 and Example 2. However, Comparative Example 1, Comparative Example 2, Example 1, and Example 2 were all confirmed to have a certain level of adhesion strength.

TABLE 1

|  | 1st cycle (0.05 C/0.05 C) | | | 2nd cycle (0.05 C/0.05 C) | | |
| --- | --- | --- | --- | --- | --- | --- |
|  | Discharge (mAh) | Charge (mAh) | Efficiency (%) | Discharge (mAh) | Charge (mAh) | Efficiency (%) |
| Comparative Example 1 | 446.4 | 533.7 | 83.6 | 423.6 | 449.6 | 94.2 |
| Comparative Example 2 | 467.8 | 538.5 | 86.9 | 468.6 | 479.4 | 97.7 |
| Example 1 | 470.4 | 543.6 | 86.5 | 471.1 | 481.9 | 97.8 |
| Example 2 | 455.4 | 519.7 | 87.6 | 456.7 | 466.8 | 97.8 |

Table 1 shows the result of confirming the charge/discharge capacity and charge/discharge efficiency by performing two cycles of initial charging and discharging of 0.05 C/0.05 C.

As shown in Table 1, the charge/discharge capacity and the charge/discharge efficiency were the lowest in Comparative Example 1. In the case of Example 1, the first cycle, that is, the initial discharge capacity is 470 mAh or greater, and in the case of Example 2, the charge/discharge efficiency is 87% or greater. Compared with Comparative Example 2, Example 1 has a superior discharge capacity, and Example 2 was confirmed to have the highest charge/discharge efficiency.

FIG. 4 is a diagram showing the charge/discharge result of a secondary battery using a negative electrode according to an embodiment of the present invention.

As shown in FIG. 4, when the lifespan evaluation is conducted by performing charging and discharging at 0.5 C/0.5 C for 50 cycles, it can be seen that Comparative Example 1 has a low lifespan because the volume expansion was not at all suppressed. In comparison, when a polymer binder is used, there is a superiority in lifespan characteristic. In particular, it can be confirmed that Example 1 and Example 2 in which the pre-dispersion slurry was used show a high lifespan characteristic when compared to Comparative Example 1 and Comparative Example 2.

FIG. 5 is a diagram showing the change in electrode thickness of a secondary battery using a negative electrode according to an embodiment of the present invention.

As shown in FIG. 5, in the case of Comparative Example 1, the initial thickness and full charge thickness of the electrode were 56.3 μm and 81.0 μm, respectively, and the full charge thickness change ratio of the electrode was measured to be 43.9%. Also, in the case of Comparative Example 2, the initial thickness and full charge thickness of the electrode were 56.5 μm and 83.6 μm, respectively, and the full charge thickness change ratio of the electrode was measured to be 48.0%.

On the other hand, in the case of Example 1, the initial thickness and full charge thickness of the electrode were 56.2 μm and 83.3 μm, respectively, and the full charge thickness change ratio of the electrode was measured to be 50.0%. Also, in the case of Example 2, the initial thickness and full charge thickness of the electrode were 57.1 μm and 81.3 μm, respectively, and the full charge thickness change ratio of the electrode was measured to be 42.4%.

Here, when the full charge thickness change ratio was confirmed after 50 cycle evaluation, Comparative Example 1 showed a low thickness expansion rate. However, in the case of Comparative Example 1, since the result of lifespan evaluation described above shows a very low lifespan, it cannot be seen the performance of the silicon-based active

TABLE 2

| | Discharge Capacity | | | | | | | | | | |
| --- | --- | --- | --- | --- | --- | --- | --- | --- | --- | --- | --- |
|  | 0.1 C Capacity (mAh) | 0.5 C Capacity (mAh) | 0.5 C/ 0.1 C Capacity (mAh) | 1.0 C Capacity (mAh) | 1.0 C/ 0.1 C Capacity (mAh) | 2.0 C Capacity (mAh) | 2.0 C/ 0.1 C Capacity (mAh) | 3.0 C Capacity (mAh) | 3.0 C/ 0.1 C Capacity (mAh) | 4.0 C Capacity (mAh) | 4.0 C/ 0.1 C Capacity (mAh) |
| Comparative Example 1 | 404.1 | 385.5 | 95.4 | 373.7 | 92.5 | 360.3 | 89.2 | 347.9 | 86.1 | 319.7 | 79.1 |
| Comparative Example 2 | 466.8 | 459.7 | 98.5 | 454.7 | 97.4 | 447.7 | 95.9 | 438.6 | 94.0 | 410.4 | 87.9 |
| Example 1 | 469.1 | 461.9 | 98.5 | 456.3 | 97.3 | 449 | 95.7 | 438.2 | 93.4 | 410.5 | 87.5 |
| Example 2 | 454.6 | 448.4 | 98.6 | 443.6 | 97.6 | 436.6 | 96.0 | 426.6 | 93.8 | 392.3 | 86.3 |

Table 2 shows the result of confirming the discharge rate of each discharge capacity based on the discharge capacities of 0.5 C, 1.0 C, 2.0 C, 3.0 C, 4.0 C, and the discharge capacity of 0.1 C.

As shown in Table 2, Comparative Example 1 showed a low discharge rate performance in the same manner as Table 1 described above. That is, when That is, in the case in which carboxymethyl cellulose (CMC) which is a thickener and styrene butylene rubber (SBR) which is a binder were used, it clearly shows that the volume expansion of the silicon-based active material and the breakage of the conductive network cannot be prevented.

material is exhibited. On the other hand, Example 1 shows a similar level of thickness expansion rate as Comparative Example 2, and in the case of Example 2, it can be confirmed that it shows a very low thickness expansion rate.

From the results, it can be seen that the lifespan characteristic of a secondary battery was improved both in Example 1 and Example 2 when compared to Comparative Example 1 and Comparative Example 2, and in preparing the negative electrode slurry, in the case of Example 1 in which the final negative electrode slurry is prepared by the first negative electrode slurry and the second slurry, it is possible to improve the adhesion strength to the current collector. In the case of Example 2 in which the negative electrode slurry is prepared by mixing the pre-dispersion slurry as a whole with the carbon-based active material, it is possible to effectively reduce the thickness expansion rate.

That is, according to the negative electrode for a secondary battery and the method for producing the same according to an embodiment of the present invention, by using a silicon-based active material-polymer binder combination in which a polymer binder for suppressing the expansion of a silicon-based active material is absorbed to the silicon-based active material, it is possible to effectively suppress the volume expansion of the silicon-based active material.

Also, in the case in which a negative electrode active material including both a carbon-based active material and a silicon-based active material is used, a pre-dispersion slurry is prepared by pre-dispersing the silicon-based active material in a polymer binder such that the polymer binder may be selectively absorbed on the surface of the silicon-based active material with strong adhesion strength.

That is, the volume expansion of a silicon-based active material is effectively suppressed, thereby improving the durability of a negative electrode for a secondary battery, and the lifespan characteristic of an electrochemical device manufactured by using the same may be remarkably improved.

In the above, while the preferred embodiments of the present invention have been described and illustrated using specific terms, such terms are used only for the purpose of clarifying the invention. It is to be understood that various changes and modifications may be made to the embodiments of the present invention and the described terms without departing from the spirit and scope of the following claims. Such modified embodiments should not be individually understood from the spirit and scope of the present invention, but should be regarded as being within the scope of the claims of the present invention.

What is claimed is:

1. A method for producing a negative electrode for a secondary battery, comprising:
    preparing a carbon-based active material;
    preparing a pre-dispersion slurry by mixing a silicon-based active material, a conductive material, and a polymer binder in a dispersion medium,
    wherein the silicon-based active material and polymer binder are bonded, and the polymer binder is sodium-polyacrylate (Na-PA);
    preparing a first negative electrode slurry by first mixing a portion of the pre-dispersion slurry and the carbon-based active material; and
    preparing a second negative electrode slurry by mixing the first negative electrode slurry and a remaining portion of the pre-dispersion slurry,
    applying the prepared second negative electrode slurry on a current collector; and
    forming a negative electrode by removing moisture from the second negative electrode slurry.

2. The method of claim 1, wherein a solid content of the pre-dispersion slurry is controlled by a viscosity of the pre-dispersion slurry.

3. The method of claim 2, wherein the solid content of the pre-dispersion slurry is controlled such that the pre-dispersion slurry has a viscosity of 3000 to 10000 cp.

4. The method of claim 1, wherein the pre-dispersion slurry has a solid content of 15 to 25 wt % based on a total weight of the pre-dispersion slurry.

5. The method of claim 1, wherein the second negative electrode slurry has a solid content of 40 to 50 wt % based on a total weight of the second negative electrode slurry.

6. The method of claim 1, wherein the polymer binder is present in an amount of 25 wt % to 45 wt % based on a weight of the silicon-based active material.

* * * * *